United States Patent [19]
Nagano

[11] Patent Number: 5,557,985
[45] Date of Patent: Sep. 24, 1996

[54] BICYCLE CLEAT COUPLING STRUCTURE

[75] Inventor: Masashi Nagano, Izumi, Japan

[73] Assignee: Shimano Inc., Osaka, Japan

[21] Appl. No.: 376,308

[22] Filed: Jan. 23, 1995

Related U.S. Application Data

[63] Continuation of Ser. No. 973,883, Nov. 10, 1992, abandoned.

[30] Foreign Application Priority Data

Nov. 13, 1991 [JP] Japan .................................. 3-296159

[51] Int. Cl.⁶ .................................................. G05G 1/14
[52] U.S. Cl. ................................ 74/594.6; 74/594.4
[58] Field of Search ......................... 74/594.4, 594.6; 36/131, 132

[56] References Cited

U.S. PATENT DOCUMENTS

| | | | |
|---|---|---|---|
| 4,570,310 | 2/1986 | Gelula | 74/594.6 |
| 5,048,369 | 9/1991 | Chen | 74/594.6 |
| 5,142,938 | 9/1992 | Sampson | 74/594.4 X |
| 5,203,229 | 4/1993 | Chen | 74/594.6 |
| 5,259,270 | 11/1993 | Lin | 74/594.6 |
| 5,279,184 | 1/1994 | Ogino | 74/594.4 X |

FOREIGN PATENT DOCUMENTS

| | | | |
|---|---|---|---|
| 0372165 | 6/1990 | European Pat. Off. | 74/594.6 |
| 0428140 | 5/1991 | European Pat. Off. | 36/131 |
| 0516013 | 12/1992 | European Pat. Off. | 74/594.6 |
| 2-128987 | 5/1990 | Japan | 74/594.4 |
| 3-159893 | 7/1991 | Japan | 74/594.6 |
| 4-183694 | 6/1992 | Japan | 74/594.4 |

*Primary Examiner*—Vinh T. Luong
*Attorney, Agent, or Firm*—Dickstein, Shapiro & Morin, L.L.P.

[57] ABSTRACT

An apparatus for coupling a cleat has a pedal shaft for rotatably supporting a pedal, a tread surface extending parallel to the pedal shaft for contacting a bottom of a shoe, a first pivotal axis provided on the pedal, and a first cleat clamp pivotable about the first pivotal axis. The first cleat clamp includes a recess for engaging one end of the cleat until a force exceeding a predetermined value is applied thereto. Further, this apparatus has a second cleat clamp opposed to the first cleat clamp across the pedal shaft, and a pair of restrictor projections disposed between the second cleat clamp and the pedal shaft for restricting displacement to the cleat. The second cleat clamp cooperates with the first cleat clamp to couple the cleat to the pedal. The restrictor projections are spaced apart from each other by a distance greater than a width along the pedal shaft of a portion of the cleat for contacting the restrictor projections. Thus, the cleat is allowed to oscillate freely on the tread surface through the distance between the resistors projections and about the recess.

9 Claims, 4 Drawing Sheets

BICYCLE CLEAT COUPLING STRUCTURE

This application is a continuation of application Ser. No. 07/973,883, filed Nov. 10, 1992, now abandoned.

BACKGROUND OF THE INVENTION

1. Field of the Invention

The present invention relates to a structure for coupling a cleat to a bicycle pedal.

2. Description of the Prior Art

Various structures have heretofore been used for coupling cleats to bicycle pedals. Many of these structures are designed to fix shoes to pedals. The shoes tend to move axially of the pedals with leg action during cycling. However, such coupling structures do not allow the shoes to move axially of the pedals, resulting in an additional burden imposed on the rider's legs.

FIG. 4 shows a device developed in view of the above drawback. This drawing shows clamping projections 3 and 4 formed on a pair of cleat damp of a pedal for securing a cleat to the pedal. References 5a and 5b denote engaging projections of the cleat 5 shown in FIG. 1. A pedal axis is referenced X in FIG. 4. This device allows the cleat 5 to oscillate freely about a pint of contact Z between the projection 5a of the cleat 5 and the clamping projection 3. Thus, the rear projection 5b of the cleat 5 is displaceable relative to the clamping projection 4.

With this prior structure, a treading force of the rider's foot is applied to the pedal at a point F in FIG. 4. This point F is a relatively long distance away from the point Z about which the cleat 5 is oscillatable. This results in an inconvenience that, when the cleat 5 oscillate to a large extent, the cleat 5 would readily slip off the pedal by momentum.

SUMMARY OF THE INVENTION

An object of the present invention is to provide a structure for coupling a cleat of a rider's shoe to a bicycle pedal, which coupling structure allows the cleat to oscillate horizontally relative to the pedal about a temperature position of the cleat The above object is fulfilled, according to the present invention, by an apparatus for coupling a cleat comprising a pedal shaft for rotatably supporting a pedal, a tread surface extending parallel to the pedal shaft for contacting a bottom of a shoe, a first pivotal axis provided on the pedal and a first cleat pivotable about the first pivotal axis. The first cleat clamp includes a cleat engaging device for engaging one end of the cleat until a force exceeding a predetermined value is applied thereto.

This apparatus further comprises a second cleat clamp opposed to the first cleat clamp across the pedal shaft, and a pair of restrictor projections disposed between the second cleat clamp and the pedal shaft for restricting displacement of the cleat. The second cleat clamp cooperates with the first cleat clamp to couple the cleat to the pedal.

The restrict projections are spaced apart from each other by a distance greater than a width along the pedal shaft of a portion of the cleat for contacting the restrictor projections. Thus, the cleat is allowed to oscillate freely on the tread surface through the distance between the restrictor projections and about the cleat engaging device.

As noted above, one end of the cleat is engageable with the cleat engaging device provided for the first cleat clamp for securing the cleat to the pedal This cleat engaging device and the pair of restrictor projections allow the cleat to oscillate freely about the cleat engaging device. According to the invention, the rider's leg is allowed to move along the pedal shaft to lighten the burden falling on the leg. Further, a point at which a treading force is transmitted from the rider's foot to the pedal is at a reduced distance to the center of the cleat oscillation. This allows free oscillations of the cleat with little momentum, to minimize the possibility of the cleat inadvertently becoming disengaged from the pedal.

Further and other objects, features and effects of the invention will become more apparent from the following more detailed description of the embodiment of the invention taken with reference to the accompanying drawings.

DETAILED DESCRIPTION OF THE PREFERRED EMBODIMENT

An embodiment of the present invention will be described next with reference to the drawings.

Figure 1:
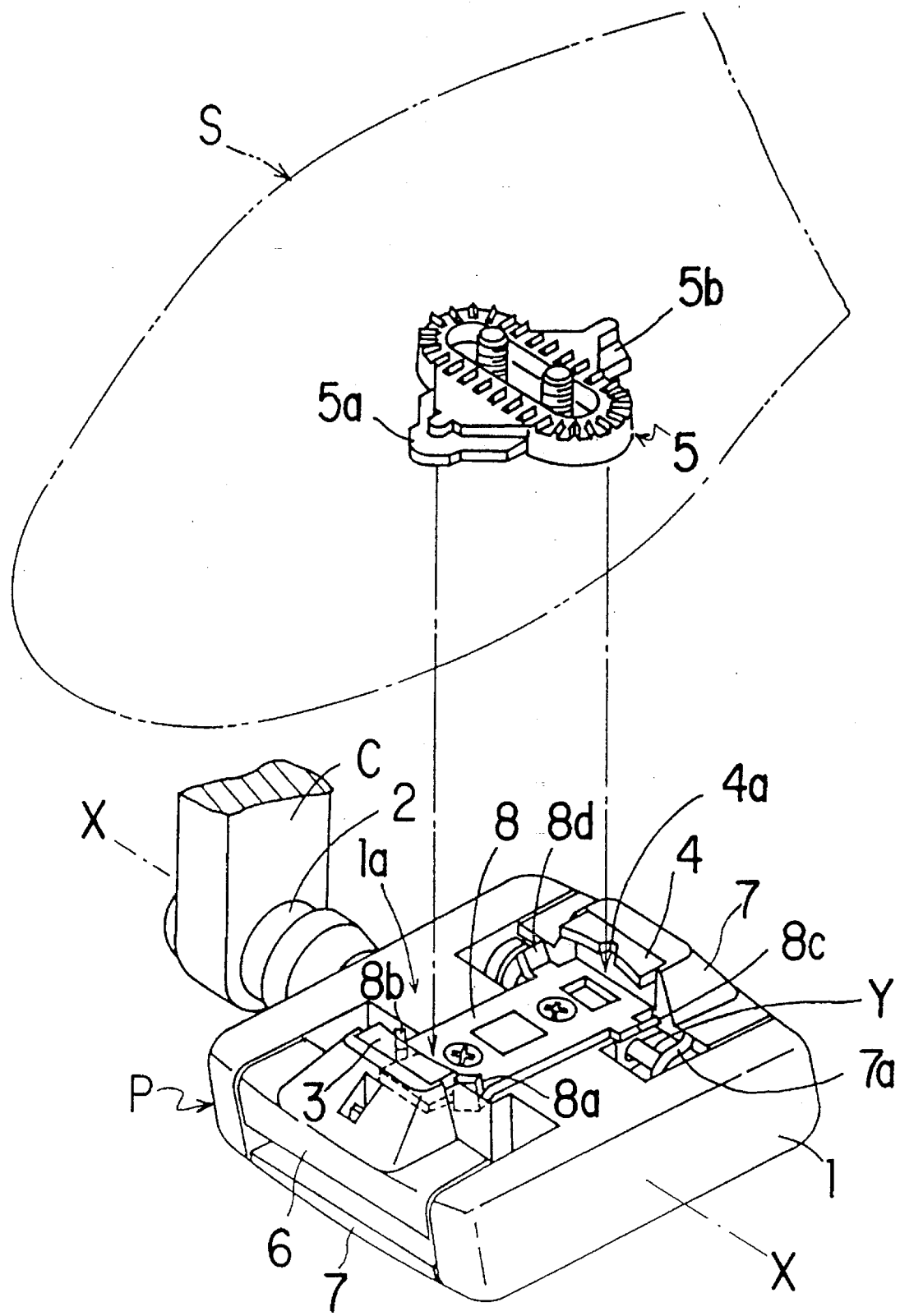
FIG. 1 a perspective view of a cleat attached to a shoe, and a pedal having a cleat coupling mechanism according to the present invention.

FIG. 1 shows a bicycle pedal P having a coupling mechanism for coupling a cleat 5. The pedal P includes a pedal body 1 rotatably supported on a pedal shaft 2 fixed to a crank arm C. A cycling shoe S is attached to the pedal P through the cleat 5.

The cleat coupling mechanism will be described next. The pedal P defines a tread surface 1a for contacting the shoe S. The tread surface 1a is provided by a contact plate 8 fixed in place by screws. The pedal P further includes a rear cleat clamp 7 mounted on a support arm 7a to be pivotable about an axis Y extending parallel to the pedal shaft 2.

The rear cleat clamp 7 includes a cleat clamping projection 4 extending substantially parallel to the tread surface 1a. The clamping projection 4 has a recess 4a for engaging a rear end projection 5b of the cleat 5. Though not shown, the rear cleat clamp 7 is biased by a lock spring in a direction to engage the cleat 5.

Figure 2:
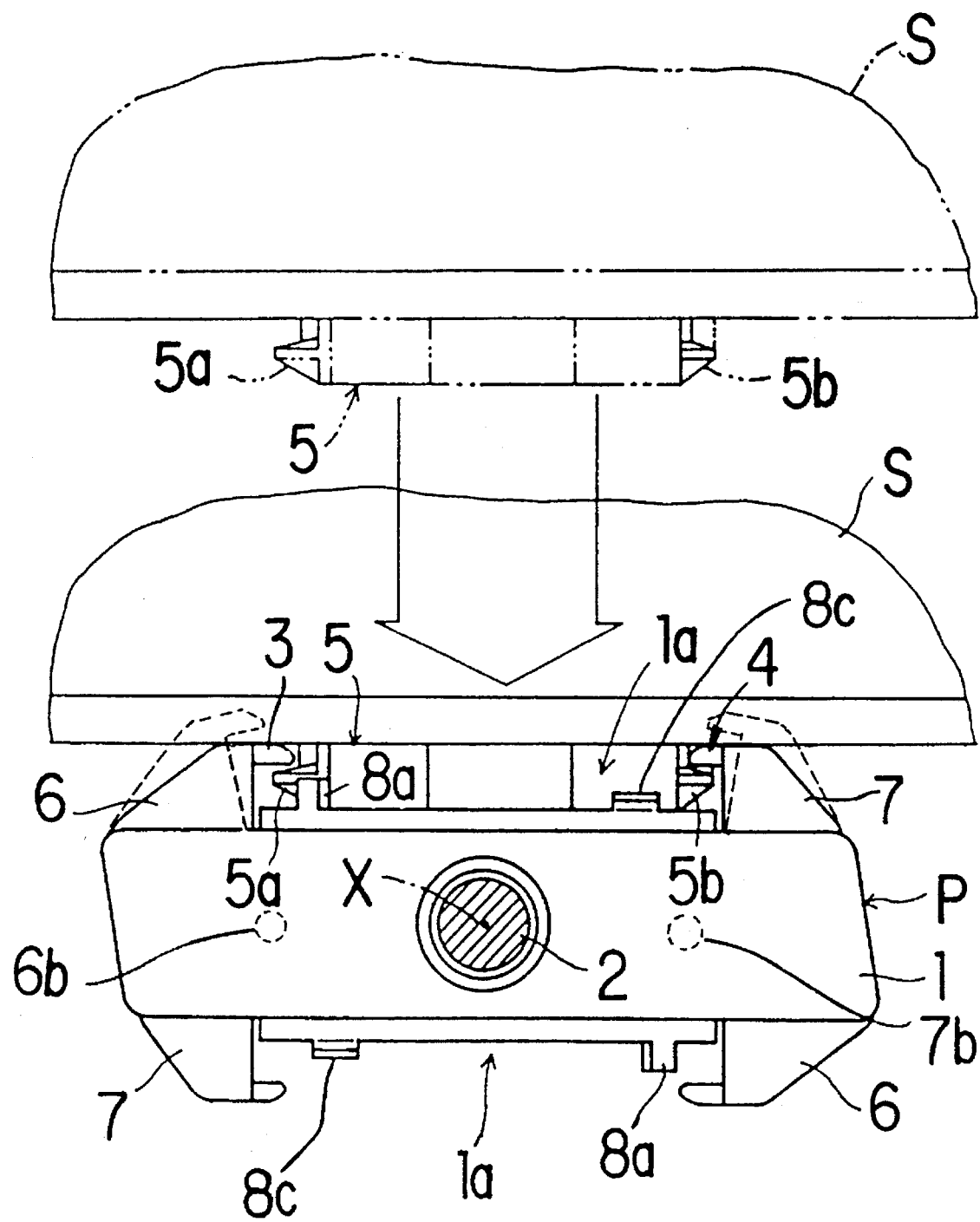
FIG. 2 is a side view showing engagement between the pedal and cleat shown in FIG. 1.

Similarity, a front or second cleat camp 6 is supported to the pivotable about an axis 6a in FIG. 2 extending parallel to the pedal shaft 2, and biased by a lock spring (not shown) in a direction to engage the cleat 5. The front cleat clamp 6 also has a cleat clamping projection 3 extending parallel to the tread surface 1a and toward the mar cleat clamp 7.

The contact plate 8 includes front restrictor projections 8a and 8b and rear restrictor projections 8c and 8d for restricting movement parallel to the contact plate 8 of the cleat 5 engaged with the pedal P. As seen from FIG. 1, the front restrictor projections 8a and 8b extend substantially perpendicular to the tread surface 1a, and diverge outwardly of the pedal P toward the rear cleat clamp 7. The rear restrictor projections 8c and 8d extend outwardly of the pedal P and away from the contact plate 8.

As seen from FIG. 2, the pedal P in this embodiment has a further pair of front cleat clamp 6 and rear cleat clamp 7 on an opposite surface.

How the cleat 5 is coupled to the cleat coupling mechanism will be described next. As shown in FIG. 1, the cleat 5 includes a projection 5a for engaging the front cleat clamp 6, and the projection 5b for engaging the rear cleat clamp 7. First, the rider inclines the shoe S to place the tip of the shoe lower than its heel (not shown), and thus the projection 5a lower than the projection 5b. Next, the projection 5a is inserted between the contact plate 8 and from cleat clamping projection 3. The front restrictor projections 8a and 8b act as guides at this time. The rider presses the cleat 5 toward the tread surface 1a with the projection 5a of the cleat 5 inserted between the contact plate 8 and front cleat clamping projection 3. This causes the rear cleat clamp 7 to pivot about the axis 76 against the biasing force of the lock spring, whereby the projection 5b of the cleat 5 is inserted between the contact plate 8 and rear clamping projection 4.

The front clamping projection 3, under the biasing force of the lock spring of the from cleat clamp 6, presses the projection 5a of the cleat 5 on the contact plate 8. Similarly, the rear clamping projection 4, under the biasing force of the lock spring of the rear cleat clamp 7, presses the projection 5b of the cleat 5 on the contact plate 8. Thus, the cleat 5 is attached to the pedal P. In this state, the restrictor projections 8a and 8b restrict free displacement of the cleat 5 in fore and aft directions. Consequently, the restrictor projections 8a and 8b prevent the cleat 5 from pushing and oscillating the from cleat clamp 6 to become disengaged from the pedal P.

When releasing the cleat 5 from the pedal P, the rider turns the shoe S until the projection 5a of the cleat 5 contacts the restrictor projection 8a or 8b. Then, the rider exerts a force exceeding a predetermined value to twist the shoe 5 about an axis substantially perpendicular to the coma plate 8 on the pedal P, using a point of contact between the projection 5a and restrictor projection 8a or 8b as a fulcrum point. This results in the projection 5b disengaging from the recess 4a. Then, the rear cleat clamp 7 pivots in a release direction against the biasing force of the lock spring (not shown), thereby releasing the cleat 5 from the pedal P. The rear restrictor projections 8c and 8d act as guides at this time to facilitate release of the cleat 5 by raising the cleat 5 from the tread surface 1a with turning of the cleat 5.

Figure 3:
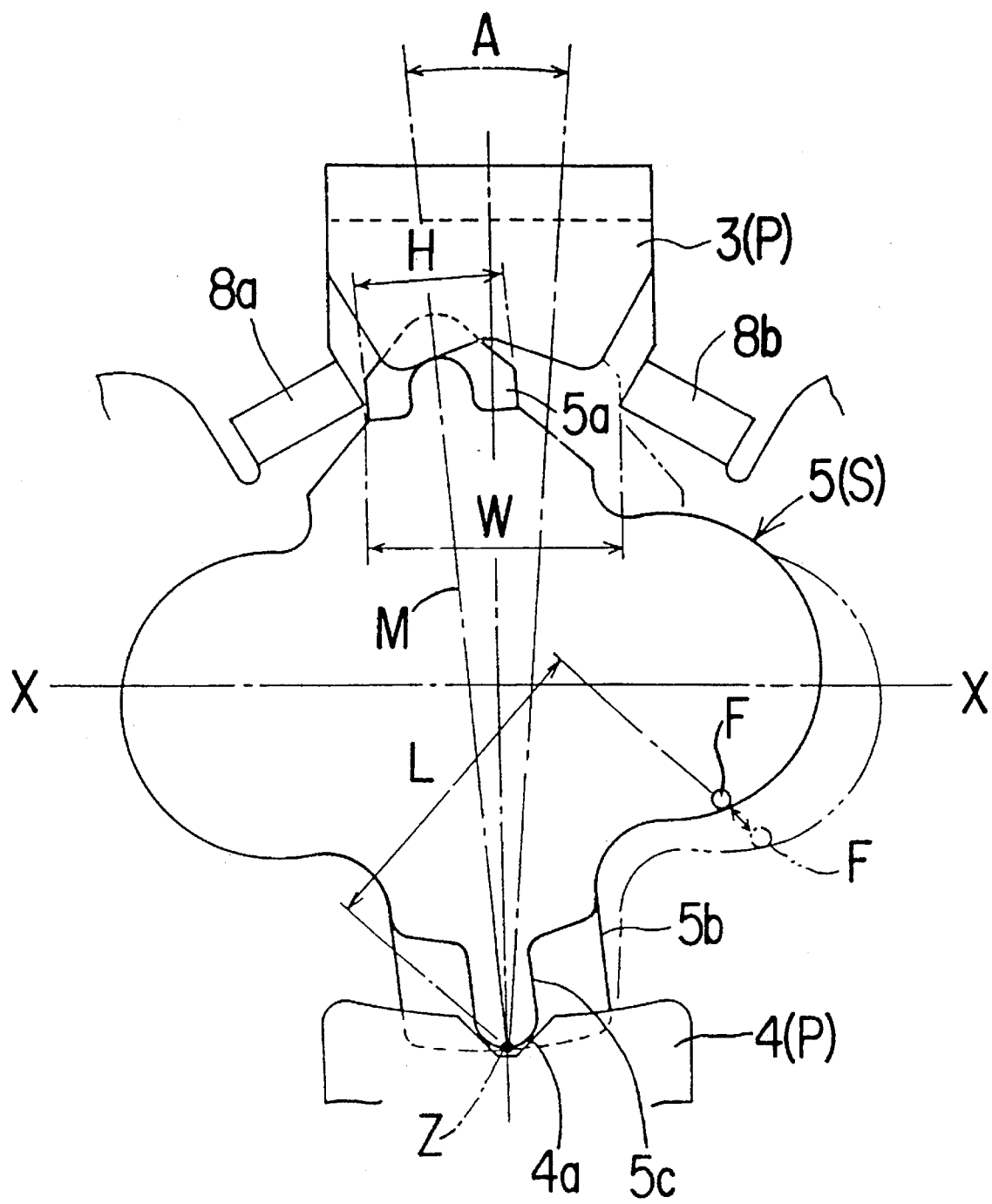
FIG. 3 is a plan view of the cleat coupling mechanism according to the present invention, with unnecessary parts omitted for convenience of illustration.

As seen from FIG. 3, the front restrictor projections 8a and 8b are spaced apart from each other by a width W which is larger than a width H of the projection 5a of the cleat 5. Thus, the projection 5a is displaceable sideways relative to the pedal P even when the cleat 5 is attached to the pedal P. The projection 5b of the cleat 5 has an extreme end 5c thereof engageable with the recess 4a defined in the rear clamping projection 4. Strictly speaking, therefore, the displacement of the cleat 5 is its oscillation about a point of contact Z between the extreme end 5c and the rear clamping projection 4. Reference M in FIG. 3 denotes a centerline of the cleat 5. This centerline M has a degree of freedom through an angle indicated by "A".

When the rider pedals the bicycle, the shoe S is allowed to move along the pedal shaft as the pedal P moves relative to a bicycle frame. Thus, the rider's leg is free from an extra burden.

Figure 4:
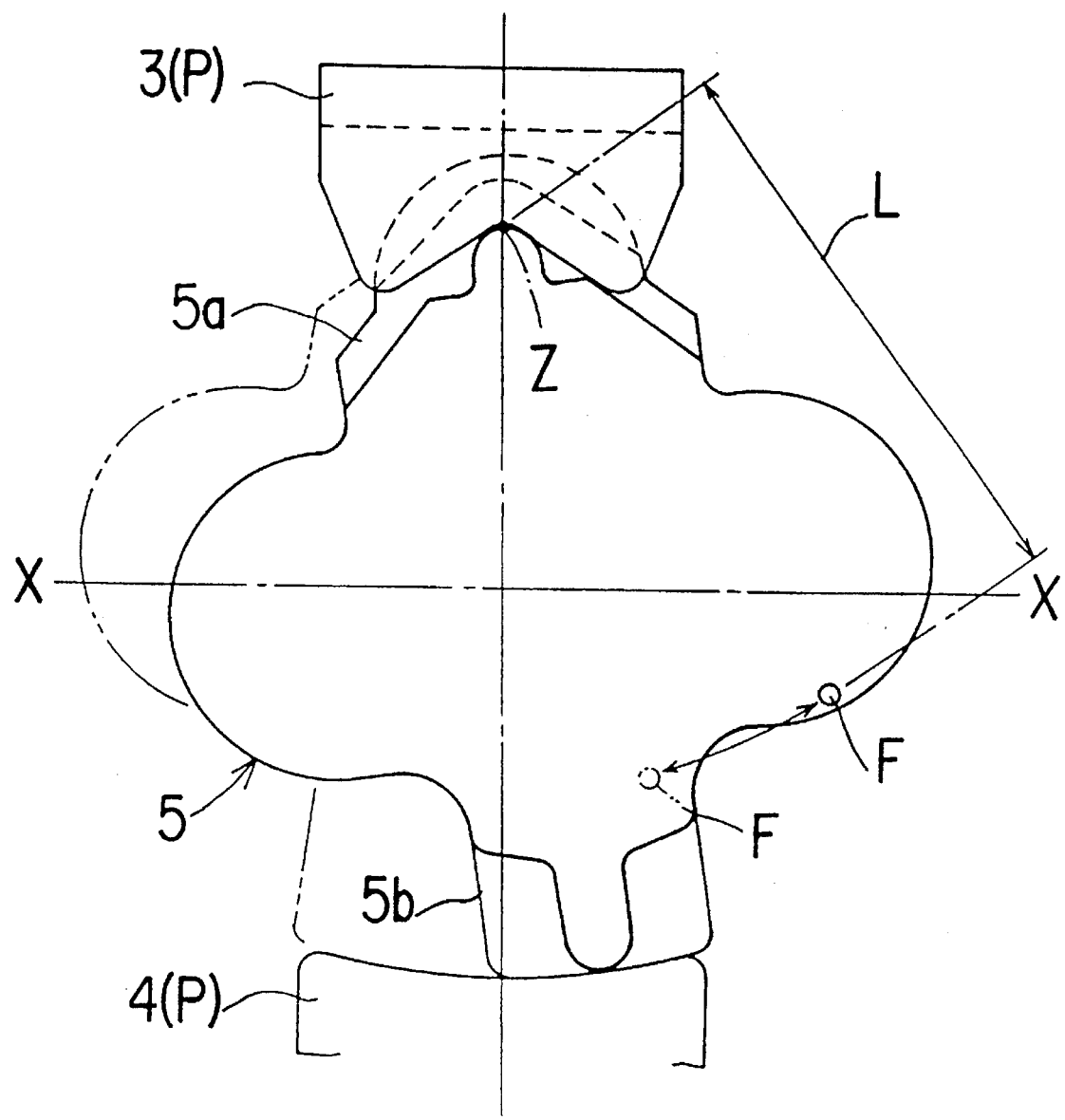
FIG. 4 is a plan view of a known cleat coupling mechanism.

FIG. 4 shows a conventional cleat coupling mechanism which also allows oscillations of the cleat. However, the oscillations are made about the point of contact Z between the front clamping projection 3 and the projection 5a of the cleat 5. The treading force of the rider's foot is applied to the pedal at the point F in FIG. 4. Since the point F is a relatively long distance away from the point Z about which the cleat 5 is oscillatable, the cleat 5 tends to slip off the pedal by momentum when oscillated to a large extent.

In the construction according to the present invention on the other hand, the point F has a short distance L to the point Z about which the cleat 5 is oscillatable as shown in FIG. 3. Although the degree of freedom provided for the cleat 5 is comparable to that of the prior art shown in FIG. 4, the movement of the cleat 5 involves little momentum, and hence a reduced chance of becoming disengaged from the pedal. Further, the oscillations about the point Z result in relatively minor variations in the distance of the point F to the pedal axis X. This in turn results in little change in the transmission rate of the treading force from the rider's foot to the pedal shaft 2.

In the foregoing embodiment, the cleat 5 is oscillatable about the point Z provided by the recess 4a in the clamping projection 4. This recess may have a width to allow the projection 5b of the cleat 5 to move freely relative to the clamping projection 4 along the axis X.

A plurality of club having varied widths H may be provided to make different degrees of cleat oscillations available. The restrictor projections 8a and 8b may be positionally adjustable to enable selection of a degree of cleat oscillations, The cleat 5 may be adapted oscillatable relative to the shoe rather than the pedal. Further, the cleat clamps 6 and 7 may be constructed oscillatable relative to the pedal body, with the cleat 5 and shoe S fixed to the cleat clamps 6 and 7.

What is claimed is:

1. An apparatus for coupling a shoe having a cleat to a bicycle pedal with a pedal shaft for rotatably supporting said pedal, comprising:

a shoe bottom opposing surface that faces a bottom of said shoe;

a first pivotal axis provided on said pedal;

a first cleat clamp supported by said first pivotal axis, and including cleat engaging means for engaging one end of said cleat until a force exceeding a predetermined value is applied thereto;

a second cleat clamp opposed to said first cleat clamp across said pedal shaft, said second cleat clamp being cooperative with said first cleat clamp to hold said cleat to said pedal; and a pair of resistor projections disposed between said second cleat clamp and said pedal shaft, a position of each restrictor projection being such that said cleat can contact said each restrictor projection when said cleat is engaged by said first and second cleat clamps, said pair of restrictor projections being provided for restricting displacement of said cleat by contact therewith;

wherein said restrictor projections project with respect to said shoe bottom opposing surface and are spaced apart in a direction substantially parallel to said first pivotal axis by a distance greater than a width along a pedal shaft of a portion of said cleat for contacting said restrictor projections, thereby allowing said cleat to oscillate freely on said shoe bottom opposing surface through said distance between said restrictor projections and about said cleat engaging means.

2. An apparatus as defined in claim 1, wherein said pedal further includes a second pivotal axis opposed to said first pivotal axis across said pedal shaft, said second cleat clamp being supported by said second pivotal axis.

3. An apparatus as defined in claim 1, wherein said restrictor projections extend substantially perpendicular to said shoe bottom opposing surface.

4. An apparatus as defined in claim 1, wherein said first and second pivotal axes extend parallel to said pedal shaft.

5. An apparatus as defined in claim 1, wherein said cleat engaging means includes a recess defined in said first cleat clamp for engaging said cleat.

6. An apparatus as defined in claim 5, wherein said first cleat clamp includes a first clamping projection extending substantially parallel to said shoe bottom opposing surface toward said second cleat clamp and defining said recess, and wherein said second cleat clamp includes a second clamping projection extending substantially parallel to said shoe bottom opposing surface toward said first cleat clamp, said first clamping projection and said second clamping projection being restricted against movement away from said shoe bottom opposing surface, thereby to hold said cleat to said pedal.

7. An apparatus as defined in claim 1, wherein said restrictor projections are aligned symmetric about a centerline extending perpendicular to said pedal shaft and included in said shoe bottom opposing surface, said restrictor projections diverging away from said centerline as said restrictor projections extend toward said second cleat clamp.

8. An apparatus as defined in claim 1, wherein said restrictor projections are arranged to restrict free movement of said cleat along a centerline extending perpendicular to said pedal shaft and included in said shoe bottom opposing surface.

9. An apparatus for coupling a shoe having a cleat to a bicycle pedal, said bicycle pedal being rotatably supported by a pedal shaft, the apparatus comprising:

a shoe bottom opposing surface extending parallel to said pedal shaft for contacting a bottom of said shoe;

a first pivotal axis provided on said pedal;

a first cleat clamp supported by said first pivotal axis, and including cleat engaging means for engaging one end of said cleat until a force exceeding a predetermined value is applied thereto;

a second cleat clamp opposed to said first cleat clamp across said pedal shaft, said second cleat clamp being cooperative with said first cleat clamp to hold said cleat to said pedal; and a pair of restrictor projections disposed between said second cleat clamp and said pedal shaft for restricting displacement of said cleat;

wherein said restrictor projections project with respect to said shoe bottom opposing surface and are spaced apart in a direction substantially parallel to said first pivotal axis by a distance greater than a width along said pedal shaft of a portion of said cleat for contacting said restrictor projections, thereby allowing said cleat to oscillate freely on said tread surface through said distance between said restrictor projections and about said cleat engaging means, and wherein said restrictor projections are aligned symmetric about a centerline extending perpendicular to said pedal shaft and included in said shoe bottom opposing surface, said restrictor projections diverging away from said centerline as said restrictor projections extend away from said second cleat clamp.

* * * * *